Patented Dec. 2, 1941

2,264,388

UNITED STATES PATENT OFFICE 2,264,388

ANTILEAK COOLING FLUID

Headlee Lamprey, Kenmore, N. Y., assignor to Carbide and Carbon Chemicals Corporation, a corporation of New York No Drawing. Application October 12, 1939,
Serial No. 299,107

9 Claims. (Cl. 252—72)

The invention relates to cooling fluids and the treatment thereof to prevent fluid loss through leakage in ordinary circulatory cooling systems of the type used with internal combustion engines. It is particularly concerned with improved leakage preventive compositions adapted as additive agents for general use with all types and kinds of cooling fluids or heat transfer liquids.

In automobile cooling systems loss of cooling fluid through leakage is a quite common occurrence and annoyance, which may arise from numerous causes. Solder pores, or minute crevices caused by imperfect union of metal parts, may often comprise sufficient openings to permit leakage. Small cracks in the radiator cells or in the various seams and soldered joints, resulting from road shock and vibration, corrosion, or freeze expansion of the cooling fluid, are other sources from which leakage may occur. To avoid major repair, attempts are usually made to effect a stoppage of small breaks and leakage orifices through the addition of anti-leak materials to the cooling fluid, and as a precaution against possible leakage, anti-leak agents have also been included in the formulating of cooling fluids of the anti-freeze type. Numerous compounds and many mixtures have heretofore been proposed as leak sealing materials, but most prior known anti-leak agents have been only temporarily effective, have been subject frequently to fermentation, have functioned properly only with water as the cooling fluid, or have been unsatisfactory for numerous other reasons.

The most desirable anti-leak composition should exhibit many properties in addition to its leak clogging ability. It should be readily and uniformly dispersible in the cooling fluid, and not susceptible to a thickening or coagulation which may interfere with the normal and proper circulation of the cooling solution. The particle size is also important from the latter standpoint, which should not be sufficient to block the radiator cells and passages. Both small crevice leaks, as well as those of a pinhole or pore type, should be effectively stopped, and a sealing or binding action is desirable to insure substantially permanent leak stoppage. Chemical inertness is important, particularly where the leak preventive may be used in conjunction with corrosion inhibitors or other additive materials, and no reaction with such compounds must occur which might destroy the required function of any of the additive agents. Obviously the most satisfactory anti-leak is one adapted for use, and of proper function, in any type of cooling fluid, particularly those which include freezing point depressants such as alcohols, glycols or glycerine. In an anti-freeze mixture the anti-leak agent must be compatible with the freezing point depressant, and capable of being formulated therewith to provide precautionary leakage protection.

It is an object of this invention to provide antileak compositions having all of the above enumerated requisite and desirable properties, and by the incorporation of said compositions in antifreeze mixtures, further to provide improved cooling fluids which have anti-leak properties in addition to anti-freeze and non-corrosive characteristics.

I have found that certain cellulose ethers, in particular hydroxyalkyl cellulose compounds, have an excellent leakage preventive action in cooling fluids. These compounds which may also be termed glycol celluloses, due to their glycol-like structure, may be formed, as shown in the art, by reacting an olefine oxide with cellulose or cellulose-derivatives. The hydroxyalkylation is usually performed in the presence of a catalyst, with or without a prior alkaline treatment of the cellulose starting product, and by control of the process conditions, including the amounts of reacted alkylene oxide, the degree of etherification may be varied over a wide range. Commercial wood pulps, cotton linters, staple cotton, or other cellulose fibers constitute satisfactory raw materials for this process, and by hydroxyalkylation as indicated will provide good anti-leak agents. Especially good results have been obtained with hydroxyethyl cellulose made from a pure grade of wood pulp largely of alpha cellulose, having fibers varying in length from about 0.1 mm. to 3.1 mm., with an average fiber length of 0.68 mm., by reacting with ethylene oxide in proportions of about 20 to 100 grams, or more specifically 40 to 45 grams, per 100 grams of the dry wood pulp. Hydroxypropyl cellulose and other hydroxyalkyl derivatives made in this manner, or by variations in the hydroxyalkylation reaction as known to the art, are also useful in their leak stoppage action, and the particular manner of forming these cellulose ethers is not limiting to the broader aspects of the invention.

These proposed anti-leak agents are readily and uniformly dispersible in all types of cooling fluids, and do not tend to coagulate or thicken, or in any other way interfere with proper circulation of the cooling solution. They are compatible with alcohols, glycols, glycerine and other types of freezing point depressants, and in the presence of corrosion inhibitors commonly used with such anti-freeze liquids, are effective in their leak stoppage action, without interfering with the required function of other addition agents. Only very small amounts of the hydroxyalkyl cellulose compounds are necessary to provide the required leakage protection, and for leakage conditions which normally can be remedied by anti-leak agents, these compounds will be found effective in concentrations varying from about 0.0005% to 0.5% by weight of the cooling fluid. A preferred use of these new anti-leak agents is in the formulating of anti-freeze mixtures, particularly those containing a monohydric or polyhydric alcohol as the freezing point depressant, and into which the leakage preventive is incorporated as a precaution against anti-freeze liquid loss when introduced into the cooling system. In ethylene glycol, and other glycol anti-freeze solutions, the hydroxyalkyl cellulose compounds have imparted excellent anti-leak properties in amounts varying from about 0.01% to 0.05% by weight of the glycol component.

As has been indicated, the invention contemplates the use of hydroxyalkyl cellulose compounds in association with practically any kind of corrosion inhibitor or other additive agents commonly used in cooling liquids. In a further modification of the invention another leakage retardant may be employed, if desired, along with these cellulose derivatives, and a mixture found especially useful includes as an additional anti-leak agent an alginate compound. Alginates, in particular alkali metal and ammonium salts of alginic acid, are in themselves very good leakage preventives, and in conjunction with a hydroxyalkyl cellulose compound, a combined anti-leak function is provided of substantial improvement over either component alone or the expected additive action of both ingredients. A water suspension, for example, of hydroxyethyl cellulose, has greater stability in the presence of sodium alginate, and a more rapid, complete and permanent leak clogging and sealing is effected by the mixture than is possible with either separate component.

In my copending application, Serial No. 294,630, filed September 13, 1939, the valuable leakage preventive properties of alginate compounds are further described, and any of the compositions therein disclosed are suitable in the proposed mixtures with hydroxyalkyl cellulose compounds. In these mixtures the components are again effective in very small concentrations, and may be used in proportions substantially similar to that indicated as suitable for their individual anti-leak purposes, i. e. about 0.0001% to 0.1% of the alginate and about 0.0005% to 0.5% of the hydroxyalkyl cellulose by weight of the cooling solution. A specific anti-freeze cooling fluid in which this leakage preventive mixture has been especially effective is one composed of ethylene glycol, or other glycol, as the freezing point depressant, and containing a mixture of about 0.01% to 0.1% of sodium alginate with about 0.01% to 0.05% of hydroxyethyl cellulose, based on the weight of the undiluted glycol component.

It will be obvious that many different cooling solution formulas may be made employing the compositions of this invention as the essential anti-leak agent, and numerous modifications are intended to be included within the scope of the invention, which should not be limited other than as defined in the appended claims.

I claim:

1. A cooling fluid containing an alcohol as a freezing point depressant, and a leakage preventive agent, said agent being composed essentially of hydroxyalkyl cellulose in an amount of about 0.0005% to about 0.5% by weight of the cooling fluid.

2. A cooling fluid containing an alcohol as a freezing point depressant, and a leakage preventive agent, said agent being composed essentially of hydroxyalkyl cellulose formed by reaction of alkylene oxide with a wood pulp mostly of alpha cellulose having an average fiber length of about 0.68 millimeter, and being present in an amount of about 0.0005% to about 0.5% by weight of the cooling fluid.

3. A cooling fluid containing an alcohol as a freezing point depressant, and a leakage preventive agent, said agent being composed essentially of a mixture of hydroxyalkyl cellulose and a compound of the group consisting of alkali metal and ammonium salts of alginic acid, the respective amounts of said compounds being about 0.0005% to about 0.5% by weight of the cooling fluid of the hydroxyalkyl cellulose and about 0.0001% to about 0.1% by weight of the alginic acid salt.

4. A cooling fluid containing an alcohol as a freezing point depressant, and a leakage preventive agent, said agent being composed essentially of a mixture of hydroxyalkyl cellulose formed by reaction of alkylene oxide with a wood pulp mostly of alpha cellulose having an average fiber length of about 0.68 millimeter, and a compound of the group consisting of alkali metal and ammonium salts of alginic acid, the respective amounts of said compounds being about 0.0005% to about 0.5% by weight of the cooling fluid of the hydroxyalkyl cellulose and about 0.0001% to about 0.1% by weight of the alginic acid salt.

5. A cooling fluid containing a glycol as a freezing point depressant, a metal corrosion inhibitor, and a leakage preventive agent, said agent being composed essentially of hydroxyalkyl cellulose in an amount of about 0.01% to about 0.05% by weight of the glycol.

6. A cooling fluid containing a glycol as a freezing point depressant, a metal corrosion inhibitor, and a leakage preventive agent, said agent being composed essentially of a mixture of hydroxyethyl cellulose and sodium alginate, in amounts respectively of about 0.01% to about 0.05% by weight of the glycol of the hydroxyethyl cellulose, and from about 0.01% to about 0.1% by weight of sodium alginate.

7. A cooling fluid containing ethylene glycol as a freezing point depressant, a metal corrosion inhibitor, and a leakage preventive agent, said agent being composed essentially of a mixture of hydroxyethyl cellulose formed by reaction of ethylene oxide with a wood pulp mostly of alpha cellulose having an average fiber length of about 0.68 millimeters, and sodium alginate, in amounts respectively of about 0.01% to 0.05% by weight of the ethylene glycol of the hydroxyethyl cellulose, and about 0.01% to 0.1% by weight of the sodium alginate.

8. Method of preventing leakage of cooling fluid in a circulatory cooling system, which comprises circulating said cooling fluid with an admixture thereto of an anti-leak agent composed essentially of a hydroxyalkyl cellulose, in an amount of about 0.0005% to 0.5% by weight of the cooling fluid.

9. Method of preventing leakage of cooling fluid in a circulatory cooling system, which comprises circulating said cooling fluid with an admixture thereto of an anti-leak agent composed essentially of a mixture of hydroxyalkyl cellulose formed by reaction of alkylene oxide with a wood pulp mostly of alpha cellulose having an average fiber length of about 0.68 millimeter, and a compound of a group consisting of alkali metal and ammonium salts of alginic acid, the respective amounts of said compounds being about 0.0005% to 0.5% by weight of the cooling fluid of the hydroxyalkyl cellulose and about 0.0001% to about 0.1% by weight of the alginic acid salt.

HEADLEE LAMPREY.